United States Patent [19]

Powell

[11] 4,090,561

[45] May 23, 1978

[54] METHOD FOR CEMENTING WELL PIPE

[75] Inventor: Jerome L. Powell, Katy, Tex.

[73] Assignee: Exxon Production Research Company, Houston, Tex.

[21] Appl. No.: 780,747

[22] Filed: Mar. 24, 1977

Related U.S. Application Data

[63] Continuation-in-part of Ser. No. 679,278, Apr. 22, 1976, abandoned.

[51] Int. Cl.$^2$ .................... E21B 21/00; E21B 33/14
[52] U.S. Cl. .................................... 166/292; 166/312
[58] Field of Search ............... 166/285, 292, 291, 311, 166/312

[56] References Cited

U.S. PATENT DOCUMENTS

| | | | |
|---|---|---|---|
| 2,326,577 | 8/1943 | Teague | 166/292 |
| 2,675,082 | 4/1954 | Hall | 166/285 |
| 3,180,748 | 4/1965 | Holmgren et al. | 166/292 X |
| 3,863,718 | 2/1975 | Bruist | 166/285 |

OTHER PUBLICATIONS

McLean et al., "Displacement Mechanics in Primary Cementing", Journal of Petroleum Technology, Feb. 1967, pp. 251-260.

Primary Examiner—Stephen J. Novosad
Attorney, Agent, or Firm—John S. Schneider

[57] ABSTRACT

A method for displacing drilling mud from the annular space surrounding well pipe or pipes arranged in a well bore more efficiently when cementing those pipes in the well bore. The method employs a cement slurry containing large particles in the amount of at least about 20 and preferably about 30 pounds per sack of cement.

7 Claims, 2 Drawing Figures

METHOD FOR CEMENTING WELL PIPE

BACKGROUND OF THE INVENTION

This application is a continuation-in-part of U.S. patent application Ser. No. 679,278, filed Apr. 22, 1976, now abandoned.

The present invention concerns a method for cementing well pipes in well bores of oil and gas wells and, particularly, a method in which the efficiency of displacement of drilling mud by a cement slurry is increased.

Following completion of many oils and gas wells, leakage occurs due to fluid communication along or through the sheath of cement that surrounds the well pipe or casing. In some of these leakage occurrences, the fluid communication occurs through channels that are created by incomplete displacement of drilling mud by cement. The present invention is designed to improve displacement of drilling mud from the annular space surrounding the well pipe in a cementing operation to avoid channeling and other problems caused by incomplete displacement of drilling mud.

SUMMARY OF THE INVENTION

A method for displacing drilling mud from the annular space surrounding a well pipe arranged in a well bore by a cement slurry more efficiently when cementing such pipe in said well bore in which large particles in the amount of at least about 20 and preferably about 30 pounds per sack of cement are added to the cement slurry. The invention also includes the cement slurry composition employed in this mud displacement method.

DESCRIPTION OF THE PREFERRED EMBODIMENTS

When cementing a well pipe in a borehole, a cement slurry is pumped down the well pipe and up the annulus formed between the well pipe and the borehole wall and displaces drilling mud from such annulus. To determine the efficiency of displacement of the drilling mud by the cement slurry tests were conducted in a scaled down model of a well bore. The test equipment and general procedures employed in conducting those tests are described in detail in an article entitled "Mud Displacement With Cement Slurries" by C. R. Clark and L. G. Carter, Journal of Petroleum Technology, Vol. 25 pages 775-783, July 1973. Briefly, in the tests the well bore was simulated by a porous consolidated sand core which was cast inside a perforated steel casing. The core was suspended within a water-filled test cell which was provided with a hot oil jacket. This arrangement permitted filtration to occur and control of environmental temperature. A tubing was arranged in the core spaced from the core wall to simulate a well pipe spaced from a borehole wall by an annular space. Mud was circulated down the well pipe and up the annular space between the well pipe and the borehole wall. Various aspects of actual operations such as circulation and pulling and running pipe along with actual hole conditions were simulated by carefully controlling temperature, pressure differential across the core and shut-in periods. The mud conditioning was followed by circulation of a cement slurry down the well pipe and up the annular space between the well pipe and borehole wall and subsequent mud displacement. The sample was cured, cut into sections and planimetered for displacement calculations.

Figure 1:
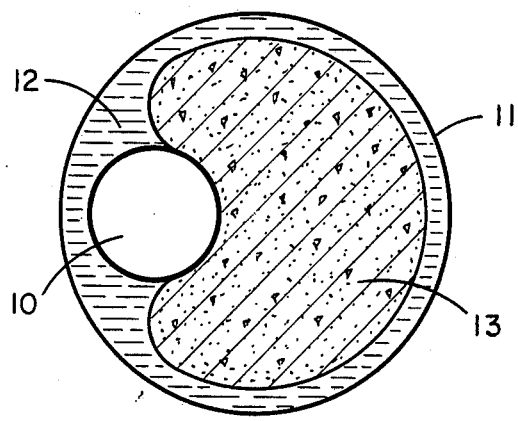
FIG. 1 illustrates the manner in which the displacement efficiency is calculated.

In FIG. 1 the well pipe is indicated by numeral 10, the borehole by numeral 11, the drilling mud by numeral 12 and the cement by numeral 13. The percent displacement efficiency equals cement area divided by annulus area (borehole area minus pipe area) multiplied by one hundred. The cement slurry employed in the tests had varying yield points and a density of about 14 pounds per gallon. The cement used in the cement slurry was a common Class H cement as specified in API Standard 10A: Specification for Oilwell Cements and Cement Additives. The yield point was measured with a standard rotating viscometer prior to sand addition while density was measured with an API standard mud balance densimeter after sand addition. The mud employed was a low yield point type with a density of about 11 pounds per gallon. Results of the tests are shown in the Table I below by test pairs where the sand content is the only variation between the two tests. Cement pump rate is measured in gallons per minute (GPM), YP is yield point in pounds per 100 square feet (lb/100 ft$^2$), sand concentration of the cement slurry and size of the sand particles are in pounds per sack of cement and mesh, respectively, (lb/sk and mesh), pipe reciprocation is in feet per minute (fpm), average displacement efficiency is in percent (%), and the effect of sand is measured as the difference in displacement efficiencies between the two tests in each pair.

TABLE I

| Test | Pump Rate (GPM) | Slurry Y.P. (lb/100 ft$^2$) | Sand Concentration & Size (lb/sk & Mesh) | Reciprocation (fpm) | Avg. Displacement Efficiency (%) | Sand Effect (%) |
|---|---|---|---|---|---|---|
| 1 | 10 | 18 | 30/10-20 | 0 | 53 | |
| 2 | 10 | 16 | 0 | 0 | 56 | −3 |
| 3 | 10 | 69 | 30/10-20 | 0 | 85 | |
| 4 | 10 | 68 | 0 | 0 | 82 | +3 |
| 5 | 25 | 17 | 20/10-20 | 0 | 71 | |
| 6 | 25 | 19 | 0 | 0 | 43 | +28 |
| 7 | 25 | 70 | 30/10-20 | 0 | 86 | |
| 8 | 25 | 73 | 0 | 0 | 74 | +12 |
| 9 | 10 | 17 | 30/10-20 | 13 | 83 | |
| 10 | 10 | 16 | 0 | 13 | 11 | +72 |
| 11 | 10 | 69 | 30/10-20 | 13 | 91 | |
| 12 | 10 | 68 | 0 | 13 | 87 | +4 |
| 13 | 25 | 16 | 30/10-20 | 13 | 82 | |
| 14 | 25 | 17 | 0 | 13 | 60 | +22 |
| 15 | 25 | 70 | 30/10-20 | 13 | 89 | |
| 16 | 25 | 68 | 0 | 13 | 57 | +32 |

In general, the foregoing tests show that cement slurries containing sand (odd numbered tests) averaged 80% compared to 59% for slurries without sand (even numbered tests). Statistical analysis of the tests confirmed that including sand in the cement slurries significantly increased displacement efficiency.

Two additional tests were conducted to evaluate the effect of sand concentration in the cement slurries. The results together with applicable tests, Nos. 5 and 6 above, are presented in Table II below and in FIG. 2.

TABLE II

| Test | Pump Rate (GPM) | Slurry Y.P. (lb/100 ft$^2$) | Sand Concentration & Size (lb/sk & Mesh) | Reciprocation (fpm) | Avg. Displacement Efficiency (%) |
|---|---|---|---|---|---|
| 6  | 25 | 19 | 0 | 0 | 43 |
| 17 | 25 | 16 | 10/10–20 | 0 | 55 |
| 5  | 25 | 17 | 30/10–20 | 0 | 71 |
| 18 | 25 | 17 | 60/10–20 | 0 | 75 |
|    |    | 17-average |  |  |  |

Figure 2:
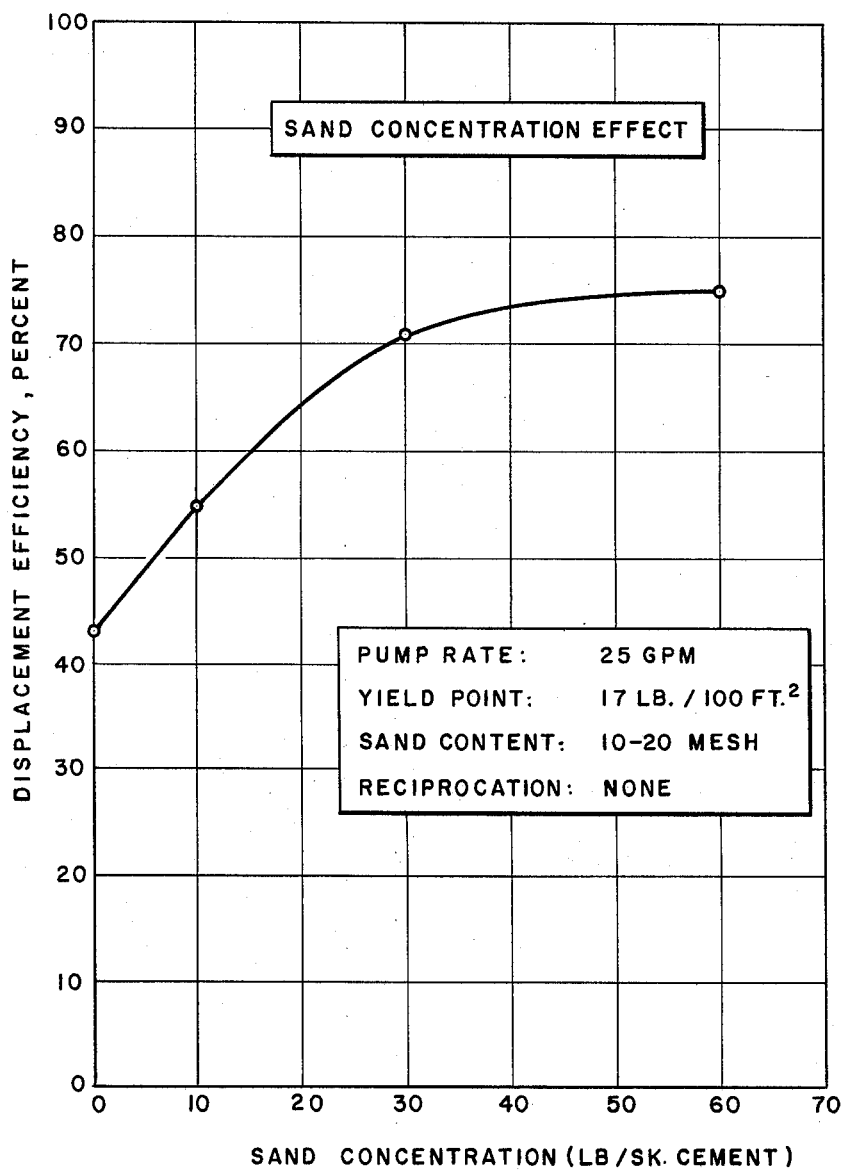
FIG. 2 is a plot of displacement efficiency versus sand concentration illustrating the effect of the sand concentration.

As illustrated in FIG. 2, there is a rather constant increase in displacement efficiency that begins to diminish at a sand concentration of about 20 pounds of sand per sack of cement and diminishes more significantly at about 30 pounds of sand per sack of cement. The sand concentration in the cement slurry, therefore, should be at least about 20 and preferably about 30 pounds of sand per sack of cement.

Other high density, e.g. specific gravity in the range of about 2 to 5, particulate materials might be used in place of or together with the large particles of sand, such as gravel, aluminum oxide, iron oxide and similar materials or mixtures thereof. The size of the particulate material may vary from the 10–20 mesh particles used in the tests. For example, particles in the range of about 8 to 40 mesh may be used. The cement slurry as contemplated in the method of this invention is intended to include hydraulic aqueous slurries of hydraulic and pozzolan cements such as Portland cement either of the normal, high early strength or slow setting types; mixtures of lime, silica and alumina; mixtures of lime, magnesia, silica, alumina or iron oxide; hydraulic limes, grapper cements; pozzolan cements, and natural cements.

Instead of circulating the cement slurry down the well pipe and up the annular space between the drill pipe and up the annular space between the drill pipe and the borehole wall, as described supra, the cement slurry may be circulated down the annular space to displace drilling mud up the well pipe in accordance with cementing techniques known in the art. Also, although a 14 pounds per gallon cement slurry and an 11 pounds per gallon mud were employed in the tests, as is well known in the art those densities vary in practice with the cement slurry generally heavier than the mud. Other variations in the method of cementing well pipe and in the cement slurry and mud systems may be made without departing from the scope of the invention as defined in the appended claims.

Having fully described the method, composition, advantages and objects of my invention I claim:

1. A method for displacing drilling mud from the annular space surrounding a well pipe arranged in a well bore more efficiently when cementing the well pipe in the well bore comprising the steps of:
    displacing said drilling mud from said annular space with a cement slurry containing large particles in the range of about 8 – 40 mesh of particulate material in the amount of at least about 20 pounds per sack of cement.

2. A method as recited in claim 1 in which said material is sand.

3. A method as recited in claim 1 in which said material is high density material.

4. A method as recited in claim 1 in which said material in said slurry is in the amount of about 20 pounds to about 40 pounds per sack of cement.

5. A method as recited in claim 1 in which said material in said slurry is in the amount of about 30 pounds per sack of cement.

6. A method as recited in claim 2 including:
    circulating said cement slurry down said well pipe and up said annular space in displacing said drilling mud.

7. A method as recited in claim 2 including circulating said cement slurry down said annular space in displacing said drilling mud.

* * * * *